US006725428B1

(12) United States Patent
Pareschi et al.

(10) Patent No.: US 6,725,428 B1
(45) Date of Patent: Apr. 20, 2004

(54) SYSTEMS AND METHODS PROVIDING FLEXIBLE REPRESENTATIONS OF WORK

(75) Inventors: Remo Pareschi, Milan (IT); Natalie S. Glance, Meylan (FR); Daniele Pagani, Milan (IT); Jean-Marc Andreoli, Meylan (FR); Stefania Castellani, Grenoble (FR); Gunnar Teege, Munich (DE)

(73) Assignee: Xerox Corporation, Stamford, CT (US)

( * ) Notice: Subject to any disclaimer, the term of this patent is extended or adjusted under 35 U.S.C. 154(b) by 990 days.

(21) Appl. No.: 08/971,021

(22) Filed: Nov. 14, 1997

(30) Foreign Application Priority Data

Nov. 15, 1996 (GB) .......................... 96 239 54

(51) Int. Cl.[7] ............................................. G06F 7/00
(52) U.S. Cl. ................... 715/530; 705/8; 705/9
(58) Field of Search .................... 707/530; 705/7, 705/8, 9; 345/331

(56) References Cited

U.S. PATENT DOCUMENTS

| | | | | |
|---|---|---|---|---|
| 5,016,170 A | * | 5/1991 | Pollalis et al. ............... 705/7 |
| 5,301,320 A | | 4/1994 | McAtee et al. ............. 395/650 |
| 5,440,681 A | * | 8/1995 | Kudo ........................... 705/8 |
| 5,548,506 A | * | 8/1996 | Srinivasan ................... 705/8 |
| 5,659,734 A | * | 8/1997 | Tsuruta et al. ............... 707/8 |
| 5,706,452 A | * | 1/1998 | Ivanov ...................... 345/331 |
| 5,721,913 A | * | 2/1998 | Ackroff et al. ............. 707/103 |
| 5,734,837 A | * | 3/1998 | Flores et al. .................. 705/7 |
| 5,737,727 A | * | 4/1998 | Lehmann et al. ............ 705/7 |
| 5,767,848 A | * | 6/1998 | Matsuzaki et al. ......... 345/331 |
| 5,826,252 A | * | 10/1998 | Wolters, Jr. et al. ......... 707/1 |
| 5,848,393 A | * | 12/1998 | Goodridge et al. ........... 705/8 |
| 5,890,130 A | * | 3/1999 | Cox et al. ..................... 705/7 |
| 5,890,133 A | * | 3/1999 | Ernst ............................ 705/7 |
| 5,893,074 A | * | 4/1999 | Hughes et al. ................ 705/8 |
| 5,974,391 A | * | 10/1999 | Hongawa ...................... 705/7 |
| 5,974,392 A | * | 10/1999 | Endo ............................ 705/8 |
| 5,999,911 A | * | 12/1999 | Berg et al. .................... 705/9 |
| 6,002,396 A | * | 12/1999 | Davies ....................... 345/339 |
| 6,011,917 A | * | 1/2000 | Leymann et al. ............ 717/2 |
| 6,038,539 A | * | 3/2000 | Maruyama et al. .......... 705/8 |
| 6,038,541 A | * | 3/2000 | Tokuda et al. ............... 705/8 |

FOREIGN PATENT DOCUMENTS

| | | |
|---|---|---|
| EP | 0 444 669 A2 | 9/1991 |
| WO | WO 94/16395 | 7/1994 |
| WO | WO 94/29804 | 12/1994 |
| WO | WO 96/17310 | 6/1996 |

OTHER PUBLICATIONS

Abbott, Kenneth R. and Sunil K. Sarin. "Experiences with Workflow Management: Issues for the Next Generation," in CSCW'94, ACM, Chapel Hill, N.C., 1994.

(List continued on next page.)

*Primary Examiner*—Sanjiv Shah
*Assistant Examiner*—C. Paula

(57) ABSTRACT

Workflow techniques for coordinating organizational processes by providing flexible representations of work using generalized process structure grammars (GPSG). The techniques take into account that, in reality, work evolves both horizontally, in the co-operation of causally unrelated, but information-sharing tasks, and vertically, in the co-ordination of causally-dependent activities. Process modeling involves (1) viewing documents and tasks as duals of each other, capturing horizontal co-operation; and (2) exploiting constraints to express the soft dependencies among related activities and documents within the framework of generative rule-based grammars for processes, thus handling vertical co-ordination. This alleviates or avoids rigidity arising in conventional workflow solutions in part from viewing work processes as unfolding along a single line of temporally chained activities.

15 Claims, 9 Drawing Sheets

OTHER PUBLICATIONS

Andreoli, Jean–Marc et al. "The Coordination Language Facility: Coordination of Distributed Objects," Theory and Practice of Object Systems, 1996, vol. 2(2), pp. 77–94.

Bowers, John and John Churcher. "Local and Global Structuring of Computer Mediated Communication: Developing Linguistic Perspectives on CSCW in COSMOS," in *Proceedings of Conference on Computer–Supported Cooperative Work*, Sep. 26–29, 1988, Portland, OR, pp. 125–139.

Ellis, Clarence and Grzegorz Rozenberg. "Dynamic Change within Workflow Systems," in COOCS'95, ACM, Milpitas, CA, 1995, pp. 10–18.

Florijn, Gert et al. "Ariadne and HOPLa: Flexible Coordination of Collaborative Processes," in *Processings from Co–ordination '96*, Apr. 15–17, 1996, Cesena, Italy, Springer–Verlag, pp. 197–214.

Pentland, Brian T. "Grammatical Models of Organization Processes," Organization Science vol. 6, No. 5, Sep.–Oct. 1995, pp. 541–556.

Pentland, Brian T. "Process Grammars: a Generative Approach to Process Redesign," MIT–Sloan School of Management, Working Paper CCS TR #178, Aug., 1994.

Swenson, Keith D. et al. "A Business Process Environment Supporting Collaborative Planning," Collaborative Computing vol. 1, No. 1, pp. 15–34, 1994.

EP 0 843 271 A3, European Search Report for EPO counterpart Application No. 97309009.5 published Dec. 2, 1998.

Posner, Ilona R. et al., "How People Write Together," *Proceedings of the Twenty–Fifth Hawaii International Conference on System Sciences*, vol. IV: Information Systems, Hawaii, 1992, pp. 127–138.

* cited by examiner

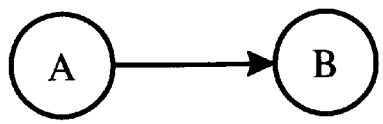
FIG. 2A
B.start := A.end
FIG. 2B
B.start ≥ A.end          (1)
B.end < deadline         (2)
B.start ≤ B.end - B.average_duration   (3)
FIG. 3
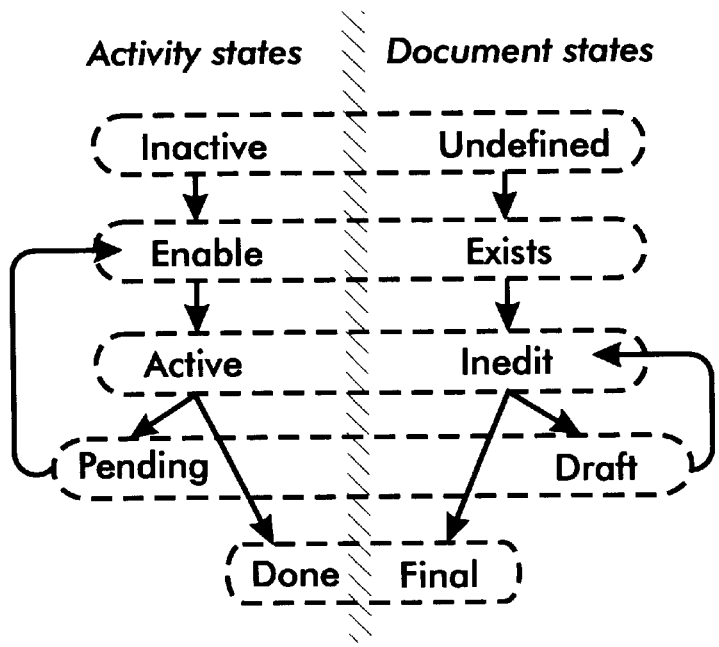
FIG. 4

```
┌─────────────────────────────────────────────────────────────────────────┐
│                                                                         │
│  ┌─────────┐     ┌──────────────┐  ┌──────────────┐  ┌──────────────┐   │
│  │task=paper│ -→ │task= write   │  │task = edit/proof│ │task = sendToReferee│  (Rule 1)
│  │doc =final│    │doc = paper   │  │doc = edits    │  │deadline = deadline│
│  └─────────┘    │end = End     │  │role = copyeditor│ │end  = End    │
│                  └──────────────┘  │end  = End     │  └──────────────┘
│                                    └──────────────┘
│        constraint = {write, edit/proof} precede sendToReferee
│        constraint = End ≤ deadline
│
│  ┌─────────┐     ┌──────────────┐  ┌──────────────┐                        (Rule 2)
│  │doc =final│ -→ │doc = paper   │  │doc = edits   │ …
│  │task=paper│    │task = write  │  │task = edit/proof│
│  └─────────┘    └──────────────┘  │group = copyeditor│
│                                    └──────────────┘
│        constraint = paper triggers edits
│        constraint = edits trigger paper
│
│  ┌──────────┐    ┌──────────────┐                                          (Rule 3)
│  │task=write│ -→ │task = research│ …
│  │doc =paper│    │doc = intro    │
│  └──────────┘    │role = authors │
│                  └──────────────┘
│
│  ┌──────────┐    ┌──────────────┐  ┌──────────────┐  ┌──────────────┐     (Rule 4)
│  │doc=paper │ -→ │doc  = intro  │  │doc  = sections│ │doc  = concl  │ …
│  │task=write│    │task = intro  │  │task = conclude│ │task = conclude│
│  │length=length│ │group = authors│ │group = {authors,││group = authors│
│  └──────────┘    │length = Lintro│ │       consult}│ │length = Lconcl│
│                  └──────────────┘  └──────────────┘  └──────────────┘
│        constraint = Lintro + Lsections + Lconcl ≤ length
│
│  ┌────────────────┐  ┌──────────────┐  ┌──────────────┐                    (Rule 5)
│  │task = sendToReferee│-→│task     = referee│ │task = comment│ …
│  └────────────────┘  │role     = referee│ │doc  = comments│
│                      │deadline = deadlineRef│role = referee│
│                      │end      = End │  └──────────────┘
│                      └──────────────┘
│        constraint = End ≤ deadLineRef
│                                                                         │
└─────────────────────────────────────────────────────────────────────────┘
```

*FIG. 8A*

```
| task   = referee |      | task     = revise     |      | task     = publish      |   | task = party! |  (Rule 6)
| status = success |  -→  | doc      = revision   |      | doc      = revisedPaper |   | role = authors |  ..
                         | role     = authors    |      | role     = publisher    |   
                         | deadline = d1         |      | deadline = d2           |
                         | end      = End1       |      | end      = End2         | constraint = revise precedes publish
                         constraint = publish enables party !
                         constraint = End1 ≤ d1
                         constraint = End2 ≤ d2

| task   = referee |  -→  | task = backToTheDrawingBoard |  ..                            (Rule 7)
| status = failure |      | role = authors               |

| doc  = revisedPaper |  -→  | doc     = comments |      | doc    = revisions |  ..       (Rule 8)
| task = revise       |      | task    = referee  |      | task   = revise    |
                             | group   = referee  |      | group  = author    |
                             | parent  = paper    |      | parent = paper     | constraint = comments precede revisions
```

*FIG. 8B*

*Task tree*

*Document tree*

SYSTEMS AND METHODS PROVIDING FLEXIBLE REPRESENTATIONS OF WORK

BACKGROUND OF THE INVENTION

1. Field of the Invention

The present invention relates to techniques for coordinating organizational processes, and more particularly to data processing systems and methods providing flexible representation, simulation and enactment of work processes using generalized process structure grammars (GPSG).

2. Description of Related Art

There are many examples of processes carried out within an organization, typically on a networked data processing platform, to which multiple individuals or departments provide inputs or invoke actions (tasks). For example, it may be necessary for a monthly report to be produced for a director, where each of three departments contributes a portion of the report, a first manager produces a summary for incorporation in the report, and a second manager indicates acceptance the report in its final version before passing it to the director (or rejects it and returns it to the previous person with instructions for changes).

A problem with some conventional approaches to the co-ordination of activities in organizations, such as those based on Petri nets and their variants, is that they require the designer to specify the entire process ahead of time, complete with alternatives and task assignments.

Although workflow approaches to the co-ordination of activities have drawn much interest, a deficiency lies in the rigidity of their organizational process models. It has been found that when models of work processes are removed from their original context and embedded into systems that drive and control human behavior, then major disruptions occur that may hinder workers' ability to get things done, forcing them to invent work-arounds that bypass the system. At best some approaches allow limited flexibility, such as a number of workflow systems which use the concept of "roles" to attach responsibility for a task to any of a group of people, and Regatta (see Swenson, K. D., Maxwell, R. J., Matsumoto, T., Saghari, B., and Irwin, K. A business process environment supporting collaborative planning, *Collaborative Computing* 1, 1 (1994), 15–34), a research prototype now available as TeamWARE Flow, which allows sub-plans to be elaborated on the fly. However, such techniques do not permit a given process instance to be incrementally singled out from the space of possible workflows defined by the rules as the process evolves.

Counterposed to workflow approaches for collaborative work are a number of computer-supported co-operative work (CSCW) systems, such as group editors and shared workspaces, which intentionally lack representations of the organizational context and goals. These systems do not attempt to co-ordinate workgroup members to accomplish a goal, but simply provide an environment for sharing common artifacts through mechanisms such as replication (e.g., Lotus Notes®) and event notification (e.g., Group Desk™). Other systems acknowledge the need for basic co-ordination mechanisms by providing locking and versioning of shared documents, based on check-in and check-out operations performed by users. These tools do not dictate behavior, but simply co-ordinate concurrent access and provide status information about other users' activities ("document X is locked because user Y checked it out at 10:35 am"). A natural extension of these basic co-ordination mechanisms is the definition of routes attached to shared documents ("send me document X after Y has checked it in, and then send it to z"). This direction has been defined as "document-oriented workflow," in contrast to "activity-oriented workflow," where processes are modeled as sequences of activities and documents are attached to activities.

CSCW techniques based on process/action grammars have been proposed. See, for example: (1) Bowers, J. and Churcher, J. "Local and Global Structuring of Computer Mediated Communication: Developing Linguistic Perspectives on CSCW in COSMOS". In *Proc. of 2nd Conf. on Computer-Supported Co-operative Work*, Portland, Oreg., 1988; (2) Pentland, B. T. Grammatical models of organizational processes. *Organization Science* 6, 5 (1995) 541; and (3) Pentland, B. T. *Process grammars: a generative approach to process redesign*. MIT-Sloan School, CCS Working Paper 178, 1994.

In particular, in the abovementioned CSCW article, Bowers and Churcher disclose the development of a language/action perspective in the COSMOS (COnfigurable Structured Message Oriented System) project, addressing the importance of seeing co-operative work in terms of participants' communicative actions, of communicative actions being embedded in dialogical contexts, and in particular of the relevance of concepts derived from the analysis of actually occurring conversations, for co-operative work especially. The distinction is made between local and global structuring of communication, as many group working situations combine both sorts. A structure definition language (SDL), by means of which users can configure their computer mediated communication environment, is presented, illustrating how its interpretation is influenced by this conversation analytic approach. However, it is noted that Bowers and Churcher consider only temporal constraints defining partial orders in the actions of a process.

The use of constraints to flexibly describe work processes has also been explored by Florijn et. al. in their co-ordination language HOPLa (see HOPLa: flexible co-ordination of collaborative processes, in *Co-ordination '96*, Springer-Verlag, Cesena, Italy, 1996), but this is done in the context of parsing a given sequence of actions (i.e., checking the process instance for "grammatical" correctness), and without focusing on generating the space of potential work actions towards a goal.

Document-centered collaborative processes in particular present a host of problems both for process modeling and for enactment. One major problem for an enactment engine is providing adequate document access control among multiple users. This involves providing versioning control, limiting access to authorized users, merging parallel version streams, and a number of other issues. The mechanics of these operations must be left to the particular technology implementation; however, its semantics must be provided by the modeling language. A second problem is designing a methodology that has the expressiveness required to represent the wide range of co-ordination methods observed in collaborative document-centered work.

It will be apparent that there is a need for systems that do not embed rigid representations of work and which acknowledge users' needs for technological support of co-ordinated efforts. There is therefore a need for systems that embed flexible representations of work. On the face of it, the co-ordination mechanisms provided by the CSCW systems described seem to fit on a spectrum ranging from unstructured work facilitated by documents sharing and versioning, to semi-structured routes attached to documents, to structured activity-oriented processes. To date, however, no CSCW system or work representation formalism is capable of spanning the entire spectrum, giving workers full choice about when to specify process representations, to what level of detail, and to what extent co-ordination should be delegated to the support system.

SUMMARY OF THE INVENTION

In accordance with the invention, there is provided a method, and apparatus therefor, for generating a representation of a work process in a memory of a data processing system. In accordance with one aspect of the invention, a first user input and a second user input are received. The first user input indicates a first object and a second object. The first object and the second object each have a set of features. The second user input indicates a rule that defines a relationship between the first object and the second object. The rule includes a constraint to be satisfied by a feature of the first object and a feature of the second object. A grammar representing the work process is compiled in the memory from the rule indicated by the second user input.

BRIEF DESCRIPTION OF THE DRAWINGS

These and other aspects of the invention will become apparent from the following description read in conjunction with the accompanying drawings wherein the same reference numerals have been applied to like parts and in which:

FIG. 2A illustrates the dependency between two activities, and FIG. 2B illustrates the corresponding (time) variable assignments, according to traditional workflow systems;

FIG. 3 illustrates the relationship between the activities of FIGS. 2A and 2B, but expressed, in accordance with the present invention, in terms of constraints;

FIG. 4 illustrates the coupling of activity states with document states;

FIGS. 8A and 8B illustrate a process grammar segment used in accordance with an illustrative embodiment of the invention, for implementing a collaborative multi-authoring process;

DETAILED DESCRIPTION

Figure 1:
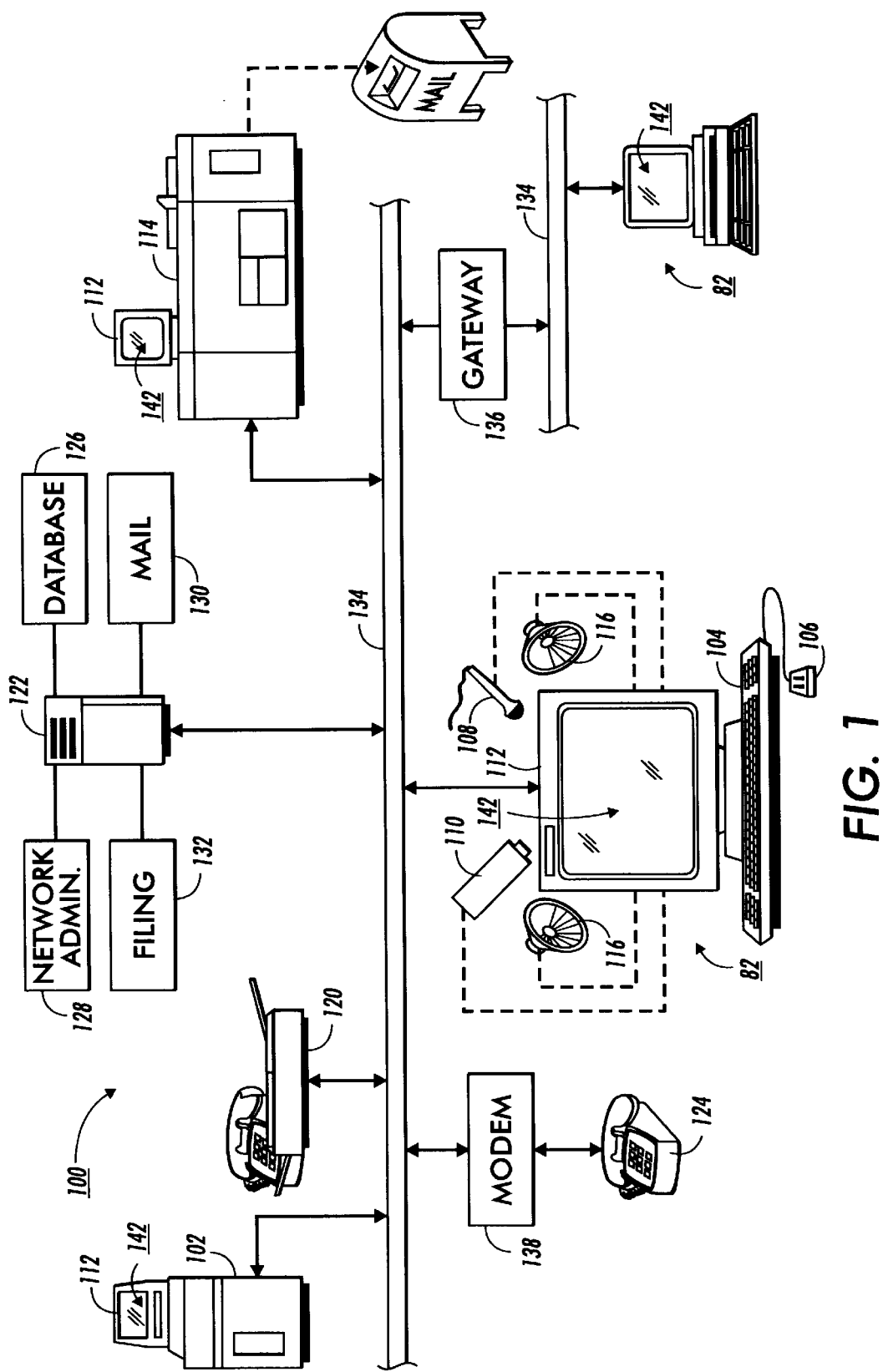
FIG. 1 illustrates a network document processing system according to one embodiment of the invention.

Referring to FIG. 1, a network document processing system according to one embodiment of the invention, for implementing the techniques described herein, is designated by the reference numeral 100. (This system is described in more detail in U.S. Pat. No. 5,790,119.) As will be recognized, the network 100 can be implemented using a variety of hardware platforms and includes devices for input including scanner or digital copier 102, keyboard 104, pointing device or mouse 106, microphone 108, and video camera 110. The system further has devices for output including display terminal 112, printer 114, and speakers 116. Input/output (I/O) devices include facsimile 120, file server 122, and telephone 124. Server 122 is configured central to or remote from workstation 82 with public, shared and/or private data storage that is differentiated by user access rights. The server 122 includes relational database system 126, network administration system 128, mail system 130 (e.g. email, voice mail) and data storage and retrieval system 132, and can be physically configured using optical drives, hard drives, floppy drives and/or tape drives. The relational database system 126 provides systems with fast query and retrieval of data.

Workstation 82 operates in a collaborative environment, where users at different workstations 82 can work together in real time to process and distribute public, shared or private information existing in different forms. (Public data is defined herein as data accessible by anyone, shared data is defined as data accessible by a limited number of users and private data is data uniquely accessible by a single user.) Workstation 82 can exist in a distributed or centralized environment. In either environment, workstation 82 is connected to other systems and devices through local area network (LAN) or wide area network (WAN) 134, gateway 136, and/or modem 138. In distributed systems, a number of workstations extend distributed processing and storage capabilities to each other, by providing for example redundant storage or a single mounting of a unique application. It will be appreciated that any of the multiple workstations 82 on the network may comprise a computer having a standard microcomputer (PC) architecture, which is well known in the art.

Workstation 82 includes an object oriented user interface (UI) 142 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview™ ("GV") software available from Xerox Corporation, which uses abstractions such as a desktop, inbasket, outbasket and documents. Referring still to FIG. 1, the UI 142 can operate remotely from any system; it is extensible across network services using remote windowing protocols such as X windows ("X Window System", W. Scheifler and James Gettys, Digital Equipment Corporation, U.S., 1992, ISBN 1-55558-088-2). For example, the UI on printer 114 is available remotely from any workstation 82 or alternate service such as scanner 102.

A. GPSG Formalism

In this section, the GPSG formalism underlying the invention is described with reference to some simple examples.

Traditional workflow systems have a Process Description Language (PDL) that allows users to define process templates. The system then allows users to instantiate process templates and execute process instances. In such workflow systems, a process template is represented as a legal phrase in the system's PDL. A process instance is the instantiation of the template. The flexibility of the process representation to adapt to the actual work practice and to changing conditions can be provided at two levels:

(1) Through conditional statements in the process template. This, however, requires changes to be anticipated during the design of the process template, i.e., before process execution;

(2) By allowing users to change the process definition during execution. Such changes, however, are always expressed as deviations from the norm (the original process template). Furthermore, dynamic changes of process templates and process instances are a difficult problem, addressed by Ellis et. al. (Dynamic change within workflow systems, In COOCS'95, ACM, Milpitas, Calif., 1995).

The GPSG approach underlying the present invention is different as illustrated in Table 1 which compares traditional workflow modeling and Generalized Process Structure Grammars. When the user wants to define a process template using the GPSG approach, s/he constructs a process grammar which specifies the lexicon of process objects (e.g., activities, documents, roles) and the rules to combine them. A process instance is any legal phrase generated from the process grammar during simulation or enactment. Indeed, a process grammar template defines a process space, a potentially infinite number of process instances. As a result, the flexibility of work representations based on the GPSG formalism is much greater because the designer can specify the constraints of the process and the rules to define what is allowed and what is not allowed, rather than the exact sequence (and alternatives) of activities and events. The flexibility of the process specification emerges from the negation of the constraints (everything not excluded by the grammar rules is possible). In contrast, within PDL frameworks, a process instance is chosen by selecting among conditional branching statements.

TABLE 1

| | Traditional Workflow Systems | GPSG approach |
|---|---|---|
| Workflow System | PDL grammar + parser of user-defined process + interpreter of process. Lexicon: activities, dependencies among activities. | GPSG grammar generator of user-defined processes + constraint solver + compiler of process. |
| Process Template | Legal phrase defined by the user respecting the PDL grammar. | User-defined process grammar; Lexicon: activities, documents; Dependencies, defined as feature constraints. |
| Process Instance | Instantiation of process template. | Legal phrase generated by the user from the process grammar. |
| Flexibility in Process Instance | Conditional statements in process template. | New legal phrase in process grammar. |
| | Change of process template. | New phrase in modified process grammar. |

Applying a Cartesian metaphor to the concept of process space, the rules can be thought of as defining the axes and the constraints as carving out the curve. There are two main categories of rules: activity-centered rules and document-centered rules (although it will be appreciated by persons skilled in the art that there could be many other rule types, e.g. role- or actor-centered rules). Activity-centered rules describe how goals (tasks) break down into sub-goals (sub-tasks) and under what conditions. For example, the goal of getting to work in the morning could be broken down into getting up, washing, eating, and driving to work. Each of these goals could be further broken down using additional rules. Dependencies among the activities might be, for instance, that one only eats when hungry and only drives in bad weather. Likewise, document-centered rules describe how documents are decomposed into sub-documents. A local paper, for example, is composed of news stories, editorials, and columns, accompanied by appropriate photographs and illustrations. Structural dependencies might include adding an editorial and photograph to accompany a late-breaking story, but cutting out another article to maintain overall line limits.

Both activities and documents are feature structures, that is, objects described by a set of features, or attribute-value pairs, explained in more detail below in section A.2. The feature values may themselves be feature objects. Interdependencies between objects are described using feature constraints, explained in section A.1 below.

A.1 Constraints

Computational constraints are relationships between variables that have two properties: (1) they can be resolved at run-time rather than during the process definition; (2) they allow variables to take a range of values. For example, in traditional workflow systems, the dependency between two activities A and B (FIG. 2A) is usually expressed with the variable assignment of FIG. 2B, in which B.start is the time when activity B starts, and A.end is the time when activity A ends. The variable assignment is always computed in the same direction (B.start is assigned the value of A.end).

Using constraints, however, much greater flexibility can be achieved, as shown in FIG. 3. The first constraint can be resolved from left to right or from right to left, depending on which variable is instantiated first. In a task-pushed execution mode, A is finished, A.end is instantiated, its value is assigned to B.start, and then B starts. However note that, because of the $\geq$ operator (constraint 1 in FIG. 3), B can start immediately or after some delay. Alternatively, if the execution mode is goal-pulled, B. end may be instantiated because a deadline is looming (constraints 2 and 3 in FIG. 3): the value of B. start is assigned to A. end and A is executed.

Thus, by using constraints, dependencies among tasks and documents can be defined more flexibly. Traditional workflow systems do not allow temporal overlap of tasks. Instead, these force either a temporally linear representation of tasks, where one task may not start until its precursor finishes, or a completely concurrent processing of tasks. With constraints, as used in the present invention, one may easily encode notions such as, "work on the paper may start any time after the literature search has begun."

Likewise, instead of saying that writing the introduction to a paper must be handled by Daniele or Remo, say, it may instead be prescribed that it may be handled by any of the authors, or perhaps, any author, but not Natalie, except for on Tuesdays. This kind of constraint also allows the person who may accomplish the task to be implicitly defined by merely stating who may not be responsible for it.

Current workflow systems have a rigid notion of task assignment and timing, document routing and structure, which greatly limits the adaptability of the process definition to current situations and ad-hoc process changes. Comparing their capabilities in the context of constraints, it could be said that these use only limited constraints, such as equality (a task is done by a certain person, or one among a certain group of people, only at a certain time, or only after some other task has been completed). By adding other kinds of constraints, such as inequality (start task any time after 10 o'clock) and disjunction (task may be done by anyone who is not a manager), the expressiveness of a process definition can be greatly increased.

More generally, the GPSG approach underlying the invention uses an expanded set of constraints to flexibly specify when and under what conditions the process grammar rules are (or are not) fired. Constraints can control the timing of activities, the scheduling of resources (people, computers, machines), the structure of documents, and access control to documents, in a way that captures process variation as well as recognized routines.

A.2 Features

Features of objects, in combination with constraints, allow rules to be used to describe not only how tasks and documents break down into sub-tasks and sub-documents, but also how these sub-parts are interwoven into relatively loose or tight webs of interdependencies. For the most part, the semantics of features emerges from the local context of the rule. However, it is very useful to have a set of features whose definition remains constant across objects and rules. In particular, the doc feature of activity objects and the task feature of document objects are central to establishing the duality between task-based rules and document-based rules. These two related features establish an interconnection between the state transitions of a document and the state transitions of its task dual. FIG. 4 shows the allowed transitions between one activity state to another and between one document state to another and also (loosely) indicates how a state transition in one of a dual pair couples to a state transition in the other of the pair. (The interconnection becomes more complex if a document is paired with more than one task, or a task with more than one document.)

More specifically, the doc feature of an activity is a pointer to the document associated with the task. When the task is enabled, the document is created, if it does not already exist. Similarly, the task feature of a document is a pointer to the activity associated with the document. Upon creation of the document, the task becomes enabled, if it is not already enabled or active. Upon the release of a new version of the document, the activity is re-enabled, if it is not already enabled or active. An important side-effect of the duality between activity vs. document rules is that a collaborative process can be seen as being initiated either through the readying of a top-level task, or through the creation of a top-level document. Thus, the GPSG framework can model both activity-triggered processes and document-triggered processes. The process example in section B below in particular highlights the duality of task-based and document-based rules.

Both activity objects and document objects have an internally maintained state feature which points to a time record of changes in state of the object. Other pre-defined features of activities are: role, the group of users able to achieve the task; duration, the estimated duration of the task; begin, the start date of the task; and end, the end date of the task. Pre-defined features of documents include: version, a time record of incremental versions of the document; group, the persons authorized to create/modify the document; length, the length of the document (e.g., in bytes or pages); parent, a pointer to the parent document; and contents, a pointer to the physical contents of the document.

Other features of tasks and documents are defined implicitly within the local context of a rule to allow, in combination with constraints, hierarchical branching, iteration, and conditional rules, examples of which are given in section B and to enforce deadlines, page limits, and role assignments, as discussed in section A.3 below.

A.3 Sample Grammar Rules

The sample grammar rules below are used to present ways in which basic, fundamental activity and document interdependencies may be represented using process grammar rules.

A.3.1 Activity-centered Rules: Temporal Dependencies

Figure 5:
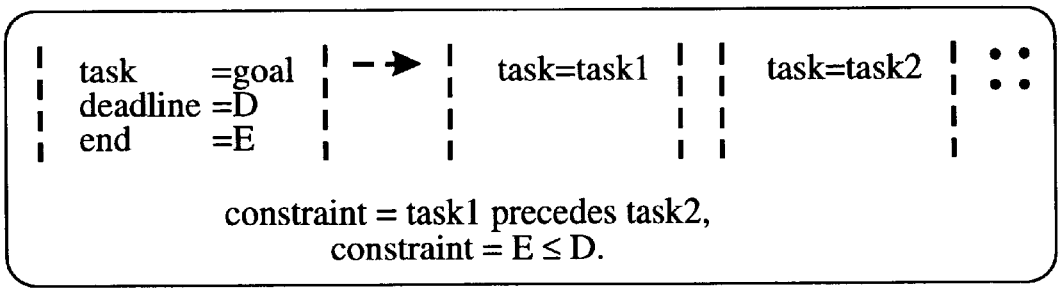
FIG. 5 illustrates an example of an activity (task) centered rule.

FIG. 5 illustrates an example of an activity-centered rule (variables local to the rule are identified by an initial capital letter) used to show how to express (a) task concurrence; (b) task sequencing; (c) task overlapping; and (d) enforcement of deadlines. The main body of the rule asserts that the task goal (the head of the rule) consists of doing task1 and task2 (the tail of the rule). The head must consist of exactly one task, while the tail can contain arbitrarily many subtasks. In addition, there is no implicit time ordering; a priori, task1 and task2 are concurrent. The features further describe the component tasks and can be used to pass values from one task to another, as well as from one rule to another, and to constrain the unfolding of tasks.

The symbol "::" separates the main body of the rule from (the arbitrarily many) constraints on the rule. The two constraints in the template limit how and under which conditions the rule may act. The first one constrains task1 to finish before task2 may start. Alternatively, we could replace this constraint with "task1 triggers task2," which more laxly allows task2 to start anytime after task1 has started. The second constraint enforces a deadline, on goal directly, and on the component subtasks implicitly (by fiat, subtasks must begin after their parent task begins and end before their parent task ends).

A.3.2 Document-Centred Rule: Structural Dependencies

Figure 6:
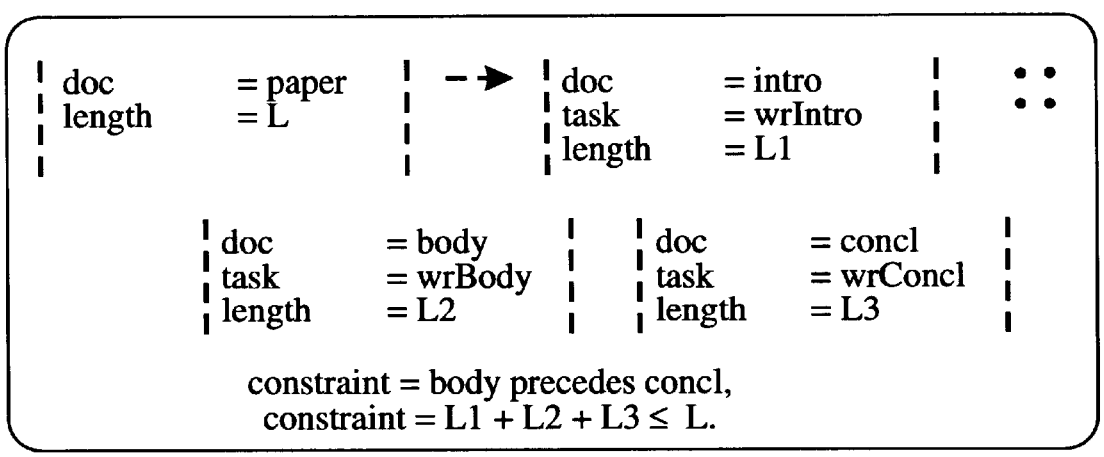
FIG. 6 illustrates an example of a document centered rule.

FIG. 6 shows an example of a document-centered rule, which superficially appears very similar to an activity-centered rule because the semantic difference lies buried in its interpretation. The similarities emphasize the dual nature of task-based and document-based rules. This example is used to illustrate how to express (a) document decomposition; (b) document triggering of tasks; (c) document versioning; and (d) enforcement of page limits.

The main body of this rule asserts that the paper document decomposes into three parts: an intro, a body, and a conclusion. Once again, the head consists of exactly one document object and the tail of arbitrarily many sub-documents. However, while activity-centered rules focus on tasks and temporal dependencies, document-based rules focus on data and structural dependencies.

By default, all sub-documents can be accessed concurrently. However, in this example, the first constraint enforces that a final version of the body be complete before the conclusion can be created. The "precedes" constraint leads to the strict sequentialization of the two documents' dual tasks: completion of the subdocument body (i.e., the dual task wrBody finishes) leads to creation of the conclusion sub-document (in turn enabling dual task wrConcl, which may then become active at any time). The second constraint enforces a physical limit on the total length of the document.

Figure 7:
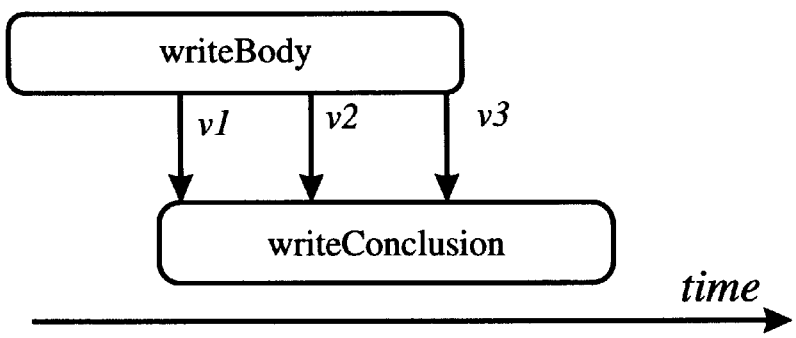
FIG. 7 illustrates the effect of substituting the first constraint in FIG. 6 with the constraint "body triggers concl"

Alternatively, if it is desired to allow work on the body and the conclusion to proceed in parallel, but in a co-ordinated fashion, we could replace the first constraint in FIG. 6 with "body triggers concl". Such a constraint allows work on the subdocument conclusion to start whenever work on the subdocument body has started, and also defines how the two efforts are co-ordinated: whenever a new version of the body is "released" by its "owners," it becomes available to the owners of the conclusion, as illustrated in FIG. 7.

In turn, this affects, wrConcl, the task dual to the conclusion sub-document: if the task was inactive or pending, it now becomes enabled. By this mechanism, changes in documents can lead to re-activation of long-lived activities. It is believed that no existing workflow system is able to represent long-lived tasks that re-awaken based on document states.

B. Example Process Grammar: Multi-authoring

Referring to FIGS. 8A and 8B, to further illustrate the use of rules and feature constraints for modeling processes, a segment of a process grammar for the collaborative multi-authoring of a research paper is presented. The multi-authoring process illustrates the many co-ordination problems of a process involving multiple actors (with multiple roles) sharing a complex, structured document.

There are many possible alternative scenarios for the multi-authoring process. The scenario modeled in this section describes the collaborative writing of a research paper, followed by submission to a referee and publishing, if accepted. The writing phase itself breaks down roughly into doing research, implementation, analysis, and writing. (Thus, the writing of a research paper is taken to be closely intertwined with the larger research agenda.) The research paper qua document is modeled as a complex structured document, roughly divisible into interdependent sections: it exhibits both decomposable and non-decomposable features. Some sections of the paper will have multiple authors and/or multiple dependencies on other sections and tasks. Over time, the paper becomes more or less decomposable with respect to the activities associated with it.

The principle roles are: author, consultant, copy-editor, referee, editor, and publisher. One actor can have multiple roles (and potentially all of them). Authors write and research the paper; consultants advise from the sidelines. Copy-editors proof-read and comment. Referees review and judge papers. Editors co-ordinate reviews from individual referees. Publishers publish papers perceived as publishable.

Associated with the grammar rules are several global variables:

(1) the role sets: authors; consultant; copy-editor; referee; publisher.

(2) deadlines: deadlines for submission, refereeing, revising, and publishing.

(3) length: page limit for the paper

For conciseness, this process description and its encoding is not intended to be complete, but instead the aim is to show that in accordance with the present invention it is possible to encode the complex co-ordination problems involved in a suitably flexible manner via process grammars.

In FIG. 8A, Rule 1 shows how the task paper breaks down into the component subtasks write, edit/proof and sendToReferee; and the constraints are (1) that write and edit/proof precede sendToReferee, and (2) that the time feature value End for each of the subtasks is on or before the time feature value deadline of the third subtask sendToReferee.

B.1 Hierarchical Decomposition

Figure 9A:
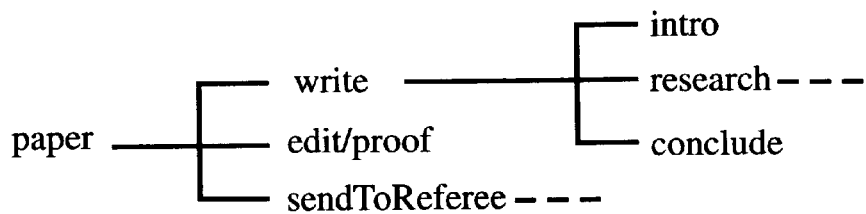
FIG. 9A illustrates a task tree corresponding to the process grammar segment of FIGS. 8A and 8B.
Figure 9B:
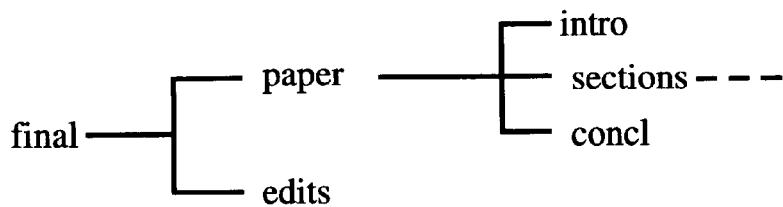
FIG. 9B illustrates a document tree corresponding to the process grammar segment of FIGS. 8A and 8B.

Sequences of rules are used to hierarchically break down the multi-authoring processes into tasks and subtasks and documents and subdocuments. FIG. 9A shows one possible task tree and FIG. 9B its complementary document tree, for the multi-authoring grammar.

The modularity of a rule-based approach makes it easy to redefine subprocesses and subdocuments. Replacing a rule defining a subprocess is like replacing a branch of the task or document tree in FIGS. 9A and 9B. Adding a rule grows a new branch; removing a rule prunes a branch.

B.2 Conditional Branching

Figure 10:
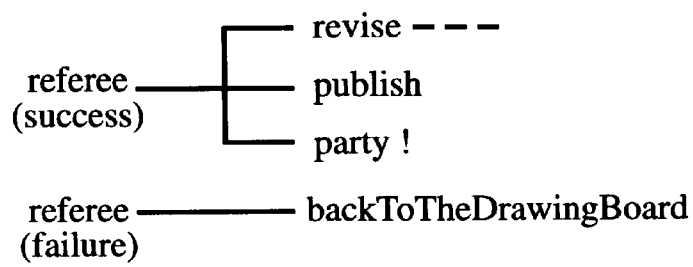
FIG. 10 illustrates two possible expansions of the sendToReferee subtask tree of FIG. 9A.

Sets of rules can also be used to describe alternative subprocesses or subdocuments. FIG. 10 shows two possible expansions of the sendToReferee subtask tree in FIG. 9A, depending on whether the referee accepts the paper or rejects it.

Using a rule-based approach, it is easy to add or remove alternatives by entering a new rule or deleting an old one. Also, it is important to note that while the example given here is purely deterministic, it will be apparent that it is also possible to branch non-deterministically among several possibilities. The evolution of the task and document trees would then have a random component.

B.3 Interwoven Activity and Document Rules

Co-ordination methods and document structure and control are highly interdependent; that is, the type of co-ordination strategies that are appropriate will depend on the structure of the document and the technology available for controlling access. This connection can be observed in Posner and Baecker's (How people write together. In *Proc. of the 25th Hawaii Int Conf. on System Sciences, Hawaii*, 1992) categorization of collaborative writing projects along four dimensions: roles, activities, document control methods, and writing strategies. In particular, we can think of document-centered processes as belonging to either one of two structural categories: decomposable document processes and non-decomposable processes, although in general, the process will be best expressed as a dynamically evolving combination of the two. In the first case, the process tasks map one-to-one onto the independent sections of a decomposable document. An example of such a process might be the writing of a book in the case where it can be broken down into almost independent sections such as the introduction, chapters, and conclusion. As a result, the co-ordination of activities for decomposable document processes can be very straightforward: each activity is associated with a portion of the document. In the second case of non-decomposable processes, there will be a many-to-one mapping of documents to tasks and tasks to documents. An example is the brainstorming, authoring, editing, and approval of a proposal, in which all steps of the process act upon the same physical document. There are two distinct co-ordination solutions for processes that require the sharing of a non-decomposable document: (1) sequential activities, where each actor works on a locked version of the shared document; and (2) concurrent activities, where the work of actors upon a frozen version is later merged.

Because the collaborative writing process of FIGS. 8A and 8B is highly document-driven, the activities and documents involved in such a process are strongly interdependent. Indeed, in the process segment of FIGS. 8A and 8B, there are many pairs of complementary activity-document rules connected via dual activities and documents. Notice that activities and documents need not match one-to-one, one activity to one piece of a document.

Figure 11:
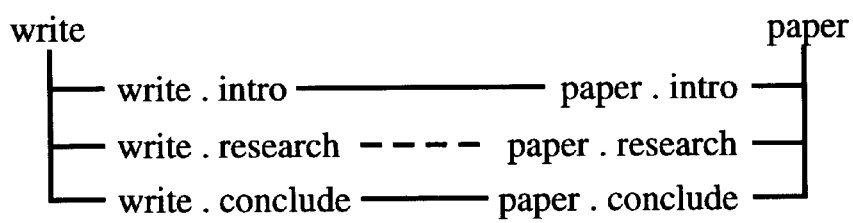
FIG. 11 illustrates the matching of subtasks of the task write with the subdocuments of the document paper.

Consider the pair of Rules 3 and 4 in FIG. 8A, connected via the activity write and the document paper. Rule 4, a document-based rule, explicitly gives the structure of the multi-authored document paper. The sections sub-document itself requires an additional rule as does the research task (not included). Rule 3 is an activity based-rule that breaks down the write task into several subtasks whose goals roughly match the sections of the written document itself as illustrated in FIG. 11.

Of the set of rules, either Rule 1 or Rule 2 could be considered the parent rules, since any activity or document can be reached using either as a starting point. However, Rules 3 and 4 can also be considered as defining a set of sub-processes that can stand on its own (write the paper, neglecting research, editing, and publication). [Parallel processes result when several rules are fired independently of each other. For example, there may be many ongoing research projects within a group.] Thus, it is possible to trigger the creation of streams of documents and activities relating to writing the paper by firing either the document rule for paper or the activity rule for write. For instance, initially triggering Rule 4 will create the paper document. Since write is the activity dual to paper, it is then enabled, triggering Rule 3. Alternatively, the same chain of events could be initiated from the activity side by triggering Rule 3 first.

B.4 Document Processes

Taking advantage of the interplay between document and activity rules, it is possible to easily model both decomposable and non-decomposable document processes, whose characteristics were summarised above, and the dynamic mixing of the two. To recap, roughly speaking, decomposable processes permit a concurrent flow of activities associated with document parts, while non-decomposable ones require either a sequential flow of activities or highly coordinated parallel flows of activities.

Figure 12:
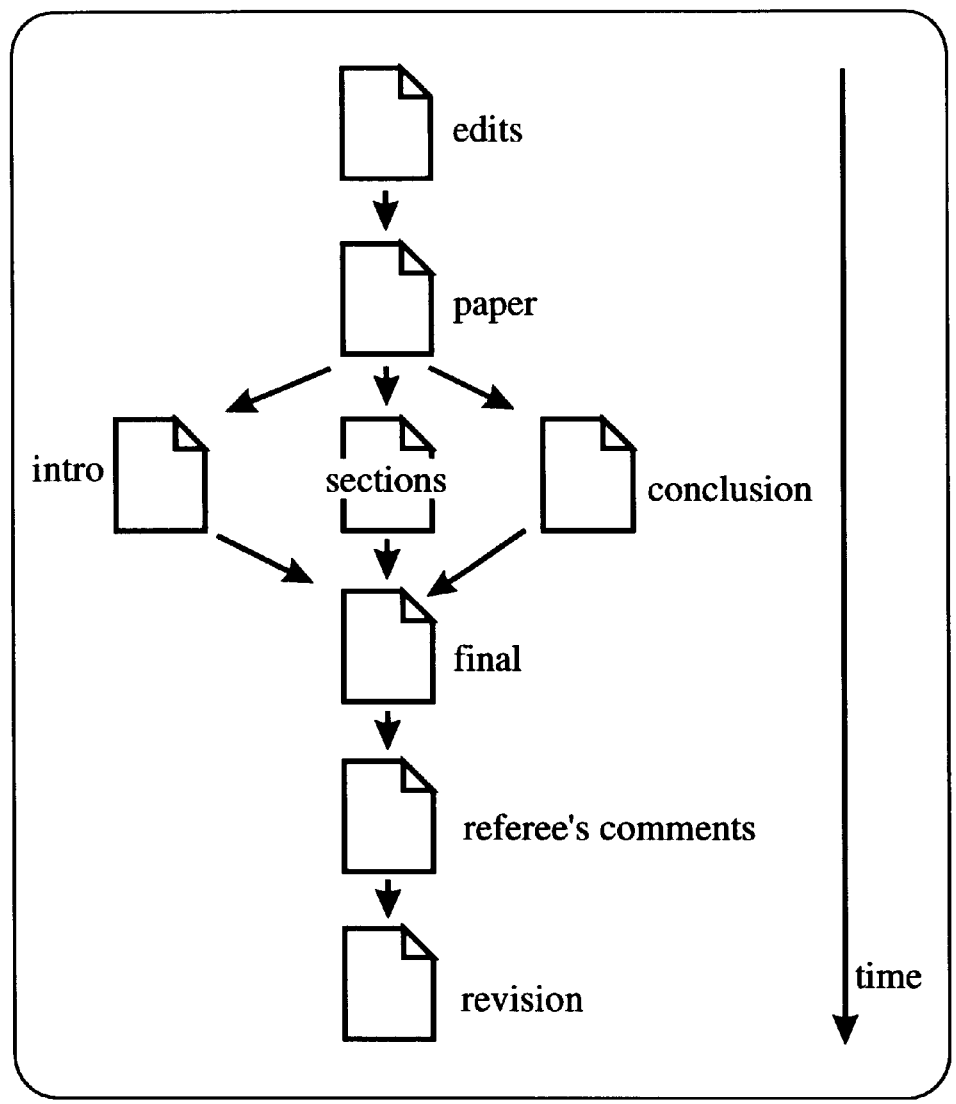
FIG. 12 illustrates a document view of the multi-authoring process of FIGS. 8A and 8B.

The decomposability or non-decomposability of a document process is defined within the context of the activities acting upon the document and its parts. In particular, the decomposability of a document may vary over time, shifting from one end of the spectrum and back again. For example, while the paper document is here considered decomposable with respect to the activities of writing the introduction, the main sections, and the conclusion (Rule 4), it is not viewed as decomposable with respect to refereeing and revising (Rule 8), nor with respect to writing and editing/proofreading (Rule 2). FIG. 12 highlights the document view of the multi-authoring process considered here, making salient the dynamic shifts in decomposability. Below are described in more detail both the decomposable and non-decomposable aspects of this simplified process.

B.4.1 Decomposable Processes: Parallel Activity Flow

Rule 4 in FIG. 8A gives an example of how to handle the decomposable aspects of a document process. Here, a paper has been modeled as a document decomposable into three parts: an introduction, several sections, and a conclusion. The absence of structural constraints (such as precedes or triggers) indicates that these are independent subdocuments and that, in the absence of timing constraints (see Rule 3) on their dual tasks, work may proceed on each of these in parallel. In this scenario, version streams of the separate subdocuments evolve independently. Alternatively, it may also be desirable to include structural constraints to represent actual interdependencies. For example, changes in the conclusion might need to be taken into account in the introduction, and the paper would no longer be entirely decomposable during the writing phase.

B.4.2 Non-decomposable Processes: Sequential Activity Flow

Rule 8 shows how a non-decomposable document process can be handled by strict sequentialization of activities dependent on the same document through use of a local constraint of the form doc1 precedes doc2. This document rule describes the structure of the final revision to be submitted for publication: the referee's comments are incorporated into the parent document paper as revisions to produce the revisedPaper. The local precedes constraint enforces that the authors cannot begin revising the paper until they receive the referee's comments, thus enforcing strict sequentiality of activities acting on the same non-decomposable parent document object, paper. Both the referee and the authors modify copies of the same document in a strictly co-ordinated sequence.

B.4.3 Non-decomposable Processes: Co-ordinated Parallel Activity Flow

Rule 2 indicates that the paper document is also not decomposable with respect to the activities of writing and editing/proofreading. This rule co-ordinates concurrent authoring and editing through the two triggers constraints: new versions of the write-stream of paper are made available to the actors responsible for the edit/proof-stream of edits, and vice-versa.

B.5 Simulation Environment and UI Aspects

Figure 13:
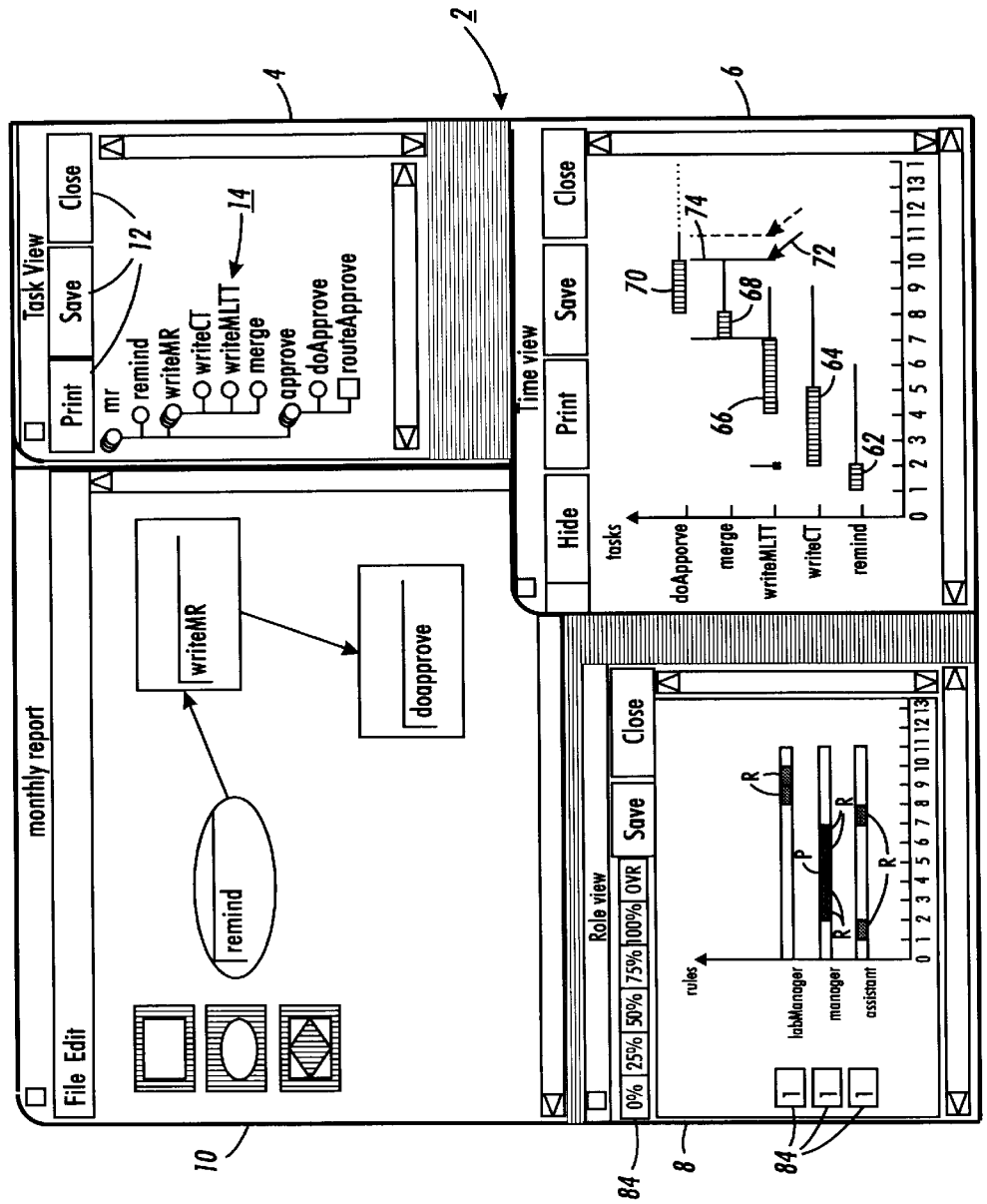
FIG. 13 illustrates a suitable user interface which may be used in implementing the present invention.

In accordance with a preferred embodiment of the invention, to support the GPSG formalism a user interface 2 is provided, as shown in FIG. 13, which guides the modeler in exploring the process space defined by a given grammar. It will be seen that there may be displayed (independently of one another) four windows 4, 6, 8, 10, the windows showing several views of the process.

The top right hand window 4 presents a task view, which shows the hierarchical decomposition of tasks into subtasks, in a manner similar to that in FIG. 9A. As well as including conventional buttons 12, window 4 presents a tree structure for the task under consideration. It will be appreciated that the task there displayed may comprise the entire process under consideration, or may be only a portion thereof. In the case illustrated, it can be seen that the task mr (monthly report) decomposes to the subtasks remind, writeMR and approve, the subtask writeMR decomposes to the subtasks writeCT, writeMLTT and merge, and so on.

The second view, presented in bottom right hand window 6, is a time view, which shows the temporal dependencies between tasks. In this case, the (bottom level) subtasks—remind, writeCT, writeMLTT, merge and doApprove—are at discrete points on the vertical axis, with time (on a suitable scale at the viewer's choice, e.g. weeks) on the horizontal axis. Blocks 62–70 represent the durations of the subtasks. By selecting with pointer 72 (operated by a conventional mouse, not shown) the vertical line 74 (which defines the endpoint of the task/process mr), various scenarios can be investigated. In this case, it can be seen that the endpoint has been moved from week 11 to week 10. The process grammar is consequently modified to reflect the change in deadline value thus input by the user.

In bottom left window 8 is presented a role view, which displays a solution for scheduling people to tasks. Time (e.g. in weeks) is on the horizontal axis. The personnel (resources) involved in the task/process are shown at discrete points on the vertical axis, and the horizontal bar opposite each resource indicates whether the resource is in use, when it is in use and to what extent. The latter is indicated by color, and a color key 84 is provided in window 8, with the extent of use being indicated with the following regime: 0%, white; 25%, pink; 50%, yellow; 75%, orange; 100%, red; and overused (i.e., OVR), purple. It will be appreciated that other values or scales may be used. In the chart illustrated, zones R are red, indicating 100% use, while zone P is purple, indicating overuse. The user can therefore readily see that the effect of moving the endpoint 74 in window 6 from week 11 to week 10 is that during the fifth week the manager will be overworked.

The user may then choose to investigate a scenario to rectify this: via input boxes 84, the user may alter the quantity of resources available. For example, the number of managers, or the number of assistants, may be changed from 1 to 2 (corresponding to arranging for additional temporary staff or the like). The process grammar is consequently modified to reflect the change in resources thus input by the user.

Finally window 10 presents a text-based grammar editor for entering the process grammar discussed in detail above. In one respect, the GSPG grammar driving the simulation process can itself be seen as a set of constraints which can be added, removed, modified. The user can interact in a simulation, namely a through this "process template" view displaying the current state of the simulation.

The views shown in windows 4–10 are interactive: changes made by the user in one view propagate to others. In the context of the multi-authoring example of the previous section, for instance, the user could explore the different process alternatives (e.g., paper accepted/rejected), move activities backwards and forwards in time, change paper deadlines and page limits, increase/decrease the number of authors or copy-editors, add/remove dependencies between different sections of the paper, and so on. All the while, the simulator ensures that these changes lie within the process space carved out by the rules and the constraints of the multi-authoring process grammar. For example, if the number of authors are too few compared with the estimated duration of activities to finish writing the paper by the deadline, the simulator will warn the user.

The above example has been described on the basis of the existence of task-based rules. However, it will be appreciated by persons skilled in the art that the invention may be implemented in a similar manner so as to recognize document-based rules as well as task-based rules.

The simulation and execution environment is quite different from that of traditional workflow systems: the simulation tool is intended to allow users to explore different process plans (i.e., different legal phrases of the grammar) and to evaluate them. Once the user has chosen a plan, the constraint solver resolves the constraint set to generate a preliminary schedule and then returns to the user, allowing further exploration of the space. The user can then instruct the system to construct an executable process specification (analogous to the process instance of a traditional workflow system). If, during execution the user needs to change the process model, then s/he can go back to the simulation environment. The simulation tool takes into account what has already been executed and cannot be undone, and allows the user to explore the process space from that point onwards. The newly refined plan can then in turn be executed.

From the side of execution, all this assumes a suitable workflow engine which has the capabilities, among others, to support overlapping, long-lived tasks and document versioning and control. Indeed, to take full advantage of the expressiveness of the GPSG approach, a next generation workflow engine, such as that built on top of the CLF (Co-ordination Language Facility), a development environment for the co-ordination of distributed objects (see Andreoli, J. M., Freeman, S., and Pareschi, R. The Co-ordination Language Facility: co-ordination of distributed objects. *Theory and Practice of Object Systems* 2, 3 (1996)), is suitably employed.

Figure 14:
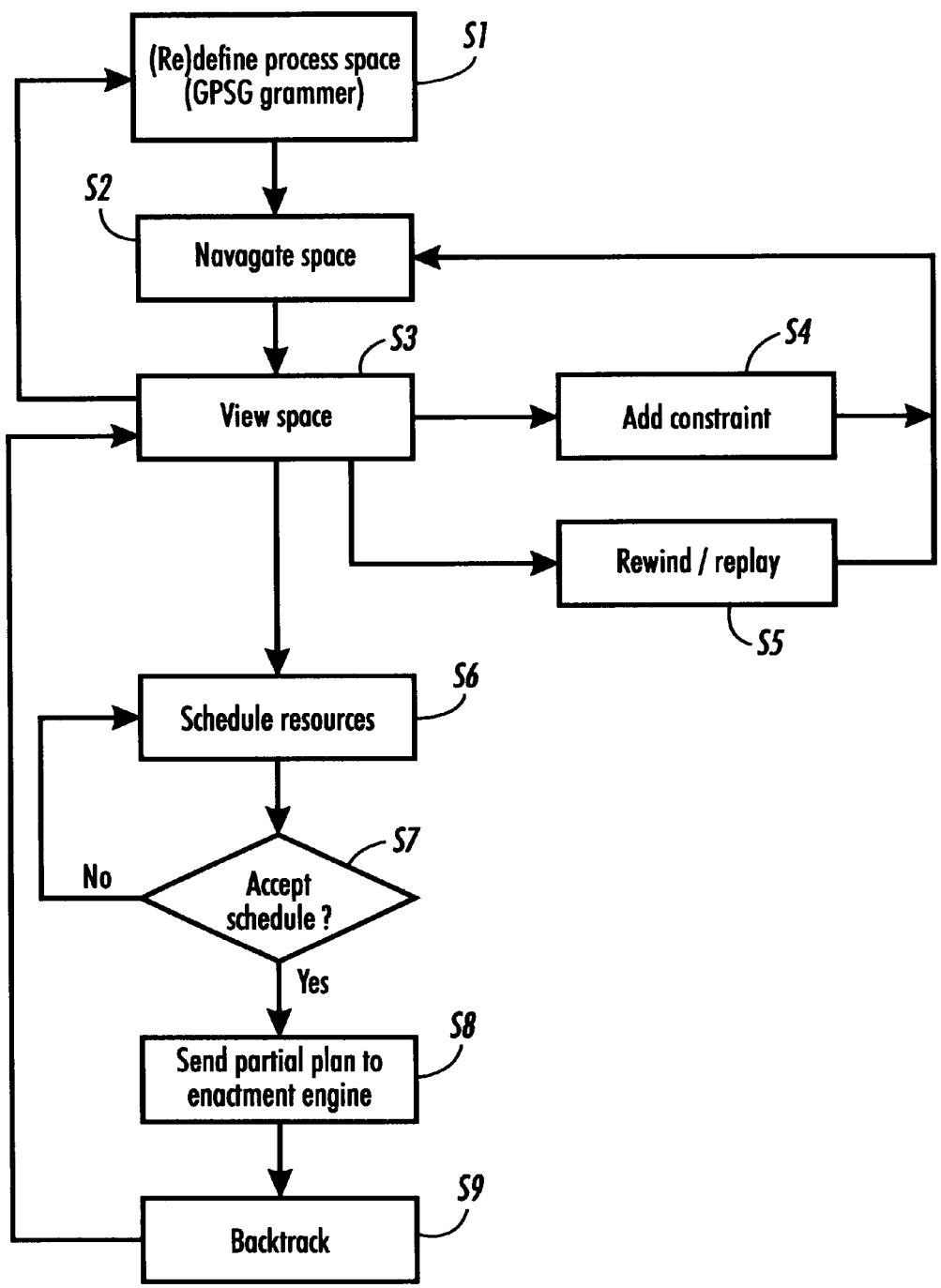
FIG. 14 is a flow chart of the methods in accordance with the invention for simulating/enacting work processes.

FIG. 14 is a flow chart of the methods in accordance with the invention for simulating/enacting work processes.

GPSG grammar specifies (step s1) a process space consisting of a potentially infinite set of process instances (the sentences recognised by the grammar), and a simulation can be viewed as an exploration of this space. At any point of time, the current state of the simulation, which may be seen as a partial sentence (containing non-terminal symbols), can be displayed through the several views of FIG. 13.

The user can interact with the system through these views by adding constraints (step s4), for example, to further constrain (or assign) the start and end times of a task, or to bound the number of resources (step s6) available at some point, or to assign a feature.

The action of adding a constraint may trigger a navigation (step s2) in the process space. Typically, if, after an action, it becomes possible to expand in a single way a subgoal which was not previously expanded, then this subgoal will be expanded, leading to a new parse tree, i.e. a new (smaller) subset of the process space. Ultimately, when all sub-goals have been expanded, a single process is obtained and the simulation ends.

However, for navigation in the process space to be flexible, it must be non-monotonic, and the user must have the possibility to "undo" some of his/her actions, i.e. to remove constraints. The naive way to achieve that is by chronological backtracking: at each user action, an image of the current state of the system just before the action is memorised, and it is restored when the user undoes this action. Although valuable, this solution has some major drawbacks: rolling back to an old backtrack point result in the loss of all the actions which have been performed since then, even those which have nothing to do with the removed action.

Intelligent backtracking schemes have been proposed in the literature, but are generally hard to implement and to integrate into a highly interactive context such as a simulation. Instead, a solution based on a rewind/replay mechanism (step s5) is used. Basically, when an action is removed, a chronological backtracking (step s9) first occurs, then all the actions which occurred after the removed action are replayed. However, some of these actions may depend on the removed one or some of its effect, and should not be replayed; hence the need to analyse the dependencies between the actions. It has been found that, in the context of a workflow process simulation based on GPSG, a simple criterion is generally sufficient for determining dependency.

To explain this criterion, it is assumed that each user action is attached to a specific task (or sub-goal), or set of tasks. This precludes such global constraints as resource bounds, discussed below. Now, a user action B, performed after a user action A, is considered dependent on A if, had the constraint added by A not been added, the task attached to B could not have existed. In other words, action B depends on action A if action A has enabled, by means of constraint propagation, the expansion of a subgoal which has generated the task attached to action B.

For example, assigning the start date of a task past a (soft) deadline may force the expansion of a subgoal in a unique way, triggering an emergency procedure. Clearly, further actions constraining the emergency procedure should not be replayed when the initial action having led to the emergency is removed. On the other hand, any action performed on a task not concerned by the emergency should be replayed.

This backtracking scheme does not apply to global constraints such as resource bounds, which may affect any task which may use the resource. Furthermore, specialised algorithms involving little or no explicit backtracking have been proposed in the literature for scheduling problems in presence of resource bounds (so-called "disjunctive scheduling"). Such specialised strategies may be included as independent tools which the user may, at any time, invoke to test punctually the feasibility of a given process state. For example, in the middle of a simulation, a user may test "what would happen if I bounded such and such resources". A specialised tool would then attempt to schedule the tasks with the given constraints, returning some new constraints which the user may choose to keep or not, and the simulation would go on normally without caring about the global constraint.

C. Conclusion

To recapitulate, the present invention relates to methods and systems for representing, simulating and enacting work that relies on a process grammar approach based on rules, objects, features, and constraints.

More particularly, the present invention provides a method carried out in a data processing system for generating a representation of a work process involving a plurality of objects, each object having a plurality of features, comprising: (a) receiving a plurality of user inputs, at least one user input indicating a first object and at least one user input indicating a rule defining a relationship between the first object and one or more other objects, the or each rule including a constraint to be satisfied by a feature of one of said objects and a feature of at least one of the other objects; and (b) compiling a grammar defining said representation from the or each rule obtained in step (a).

The invention further provides a method carried out in a data processing system for simulating a work process, comprising: (a) providing a process representation representing the work process, said process representation being generated in accordance with the abovementioned method; (b) displaying a graphical representation corresponding to said process representation; (c) receiving at least one user input, the or each user input indicating a modification to the grammar defining said process representation; (d) generating a modified process representation in dependence upon the modification input by the user in step (c); (e) displaying a graphical representation corresponding to said modified process representation.

The invention further provides a method carried out in a data processing system for controlling the enactment of a work process, comprising: (a) providing a process representation representing the work process, said process representation being generated in accordance with the abovementioned method; (b) receiving at least one user input indicating that the status of one of the objects has changed; (c) instantiating the process representation in accordance with the grammar and in dependence upon the indication input by the user in step (b).

The invention preferably employs a framework incorporating grammatical rules to generate representations of work and feature constraints to represent complex work artifacts and augment the basic capabilities of context-free grammars. This framework generalizes the grammatical approach to work processes and is referred to as Generalized Process Structure Grammars (GPSG). Behind the process/action grammars is the notion that definitions of work processes can be generated from a set of rules and a lexicon of process objects just as this sentence was generated in accordance with the rules of English grammar and an English dictionary. The aspects of GPSG which promote modeling openness are (1) the dynamical generativity of the process grammar approach; (2) the representational freedom accorded by constraints for describing soft dependencies between activities and documents; and (3) the notion of duality between activities and documents. While in practice, GPSG could be used to encode rigid models of work as readily as flexible ones, as can be seen in section B above, GPSG has the flexibility required to represent a complex multi-authoring process which co-ordinates the interdependent activities of many people across a common structured document.

In the methods and systems according to preferred embodiments of the invention, new rules can be added and existing rules can be deleted. An advantage is that this enables open process definitions, allowing incremental process design via the accumulation of local case-by-case definitions of subprocesses. In contrast, traditional modeling approaches employ the overall work representation as a template that must be defined and modified as a whole.

Preferably, dual representations of documents and activities are provided for: a rule can either define how an activity decomposes into a number of sub-activities or how a document decomposes into a number of sub-documents. In either case, constraints are used to specify dependencies between activities and document states and between document parts and their associated activities.

Preferably, flexible, or soft, temporal dependencies can be realized in several ways: through casual dependencies between activities; through triggers based on document states; and via informational dependencies between document parts. An advantage is that process definitions thereby the fixed overall order enforced by traditional workflow systems.

Advantages of the methods and systems of the present invention are that they allow:

(1) the use of flexible work representations that help workers reason about work and (re)plan activities, instead of rigid ones that dictate a predefined procedure;

(2) the location, adaptation and modification by workers of the most appropriate sequence of tasks to get things done (including short cuts, exception handling, etc.) while respecting the constraints of the work process (deadlines, rules, resource bottlenecks, etc.); and (3) the capture and enactment of different work co-ordination mechanisms, e.g. document-oriented vs. activity-oriented.

A further advantage is that the invention augments the representation of tasks and documents and the types of dependencies among them that can be expressed. Key to this is the use of constraints to describe the complex soft dependencies of actual work practice. While constraints may evoke limiting the possibilities for action, in the formal language underlying the present invention, a constraint describes the set of possibilities allowed, which collapses onto one choice only when the time for action arrives.

By contrast with the technique disclosed in the abovementioned Bowers and Churcher article, according to the present invention feature constraints are also used to describe the fine structure of process activities and artifacts, and how they relate to each other. Another advantage of the present invention is that feature objects can be organized in inheritance hierarchies in the object-oriented programming style. Thus, it will be appreciated by persons skilled in the art that while the embodiments described herein are directed to the dynamic aspects of constraint solving for the incremental run-time refinement of process models, feature constraints can also be used for building object-oriented libraries of processes.

Finally, according to the techniques underlying the invention both activities and documents are considered of equal status, in contrast with current work process modeling and enactment tools that are primarily either activity-oriented or document-oriented (Abbott, K. R. and Sarin, S. K. Experiences with workflow management: Issues for the next generation. In CSCW'94, ACM, Chapel Hill, N.C., 1994). In the GPSG formalism underlying the invention, activities and documents can be seen as duals of each other. Along one dimension, processes can be partitioned into component concurrent activities that are persistent and long-lived. Along a second dimension, processes can be partially represented by the evolution of documents and sub-documents.

The complementary interaction of activities and documents allows for a richer representation of processes. Activities trigger the creation and modification of documents; document states enable new activities and re-awaken dormant ones.

The system may be readily implemented in software using software development environments that provide portable source code that can be used on a variety of hardware platforms. Alternatively, the disclosed system may be implemented partially or fully in hardware using custom or standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for generating a representation of a work process in a memory of a data processing system, comprising the steps of:

receiving a first user input and a second user input;
      the first user input indicating a first object and a second object; the first object and the second object each having a set of features; the first object specifying an activity for creating a document; the second object specifying a state of the document for initiating the activity;
      the second user input indicating a plurality of rules for defining a relationship between the first object and the second object; the plurality of rules including a constraint to be satisfied by a feature of the first object and a feature of the second object in a manner that specifies the activity and the document are duals of each other; and compiling, in the memory, a grammar representing the work process; said compiling step generating the grammar from the plurality of rules indicated by the second user input.

2. The method according to claim 1, wherein said receiving step receives a first user input indicating a set of objects, with each object in the set of objects having a set of features; the set of objects including the first object and the second object.

3. The method according to claim 2, wherein the plurality of rules define constraints to be satisfied by ones of the objects in the set of objects; each constraint describing a set of allowable outcomes of the work process.

4. The method according to claim 1, wherein said receiving step receives a first user input indicating one feature of the document to be a pointer to a task that is associated with the document.

5. The method according to claim 1, wherein said receiving step receives a first user input indicating one feature of the document to be a pointer to the physical contents of the document.

6. The method according to claim 1, wherein said receiving step receives a first user input indicating one feature of the activity to be a pointer to a document associated with the activity.

7. The method according to claim 1, wherein said receiving step receives a first user input indicating one feature of the activity to be an estimated duration of the activity.

8. The method according to claim 1, wherein said receiving step receives a first user input indicating the second object is a component of the first object.

9. The method according to claim 1, wherein said receiving step receives a second user input indicating a rule with a constraint that triggers the first object when a predetermined value of a feature of the second object is attained.

10. The method according to claim 1, further comprising the steps of:

displaying, on a display of the data processing system, a graphical representation corresponding to the grammar representing the work process;

receiving a third user input indicating a modification to the grammar representing the work process;

compiling a modified grammar representing the work process by modifying the grammar representing the work process in accordance with the modification indicated in the third user input; and displaying, on the display of the data processing system, a graphical representation corresponding to the modified grammar representing the work process.

11. The method according to claim 10, wherein the graphical representation corresponding to the grammar representing the work process includes a first graphical form depicting a tree structure defining a relationship between the first object and the second object and their features.

12. The method according to claim 1, further comprising the steps of:

receiving a third user input indicating that the status of one of the first object and the second object have changed; and instantiating the representation of the work process in accordance with the grammar and in dependence upon the third user input indication.

13. A data processing system for generating a representation of a work process, comprising:

a memory;

a user interface for receiving a first user input and a second user input;
       the first user input indicating a first object and a second object; the first object and the second object each having a set of features; the first object specifying an activity for creating a document; the second object specifying a state of the document for initiating the activity;
       the second user input indicating a plurality of rules defining a relationship between the first object and the second object; the plurality of rules including a constraint to be satisfied by a feature of the first object and a feature of the second object in a manner that the activity and the document are duals of each other; and a processor for compiling, in the memory, a grammar representing the work process; said compiler generating the grammar from the plurality of rules indicated by the second user input.

14. The data processing system according to claim 13, wherein one feature of the document is a pointer to a task that is associated with the document.

15. The data processing system according to claim 13, wherein one feature of the activity is a pointer to a document associated with the activity.

* * * * *